United States Patent
Kamio (10) Patent No.: US 11,287,035 B2
(45) Date of Patent: Mar. 29, 2022

(54) SHIFT RANGE CONTROL APPARATUS

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 16/693,814

(22) Filed: Nov. 25, 2019

(65) Prior Publication Data
US 2020/0088294 A1    Mar. 19, 2020

Related U.S. Application Data

(63) Continuation of application No. PCT/JP2018/019083, filed on May 17, 2018.

(30) Foreign Application Priority Data

May 29, 2017   (JP) .............................. JP2017-105425

(51) Int. Cl.
| F16H 61/32 | (2006.01) |
| F16H 61/28 | (2006.01) |
| F16H 59/02 | (2006.01) |
| H02P 21/06 | (2016.01) |

(52) U.S. Cl.
CPC ..... F16H 61/2807 (2013.01); F16H 59/0204 (2013.01); F16H 61/32 (2013.01); H02P 21/06 (2013.01); F16H 2061/326 (2013.01)

(58) Field of Classification Search
CPC ............... F16H 2061/326; F16H 61/32; F16H 61/2807; F16H 59/0204; H02P 21/06
See application file for complete search history.

(56) References Cited

U.S. PATENT DOCUMENTS

| 4,911,031 | A | * | 3/1990 | Yoshimura | .......... F16H 61/0403 74/335 |
| 6,065,363 | A | * | 5/2000 | Schaller | .................. F16H 61/32 74/335 |
| 6,105,448 | A | * | 8/2000 | Borschert | ............... F16H 61/12 74/335 |
| 6,477,910 | B2 | * | 11/2002 | Ebashi | .................... F16H 61/32 74/335 |
| 7,511,444 | B2 |  | 3/2009 | Nakai et al. | |
| 7,757,577 | B2 | * | 7/2010 | Kawamoto | ............. F16H 61/28 74/335 |
| 10,234,030 | B2 | * | 3/2019 | Nakayama | ............. H02K 1/146 |
| 10,288,171 | B2 | * | 5/2019 | Yamamoto | ............... G05D 3/20 |
| 10,781,918 | B2 | * | 9/2020 | Kamio | .................... F16H 61/28 |
| 10,794,479 | B2 | * | 10/2020 | Kamio | .................... F16H 59/08 |
| 10,844,954 | B2 | * | 11/2020 | Kamio | .................... F16H 61/12 |

(Continued)

FOREIGN PATENT DOCUMENTS

| JP | 2006-336710 | 12/2006 |
| JP | 2007-218298 | 8/2007 |

*Primary Examiner* — David M Fenstermacher
(74) *Attorney, Agent, or Firm* — Nixon & Vanderhye P.C.

(57) ABSTRACT

A rotational angle sensor detects the rotational position of a motor and outputs a motor rotational angle signal corresponding to the rotational position of the motor. An output shaft sensor detects a change in the magnetic field of a target that rotates integrally with an output shaft to which the rotation of the motor is transmitted, and outputs an output shaft signal according to the rotational position of the output shaft. A shift range control unit includes a motor control unit.

7 Claims, 8 Drawing Sheets

(56) References Cited

U.S. PATENT DOCUMENTS

| | | | |
|---|---|---|---|
| 10,948,078 B2* | 3/2021 | Kamio | F16H 61/12 |
| 11,079,010 B2* | 8/2021 | Yamada | F16H 61/28 |
| 11,112,007 B2* | 9/2021 | Sakaguchi | H02K 7/00 |
| 11,125,325 B2* | 9/2021 | Sakaguchi | H02P 3/025 |
| 2004/0139815 A1* | 7/2004 | Shimamura | F16H 61/32 |
| | | | 74/335 |
| 2006/0135314 A1* | 6/2006 | Shomura | B63H 20/20 |
| | | | 477/109 |
| 2015/0142283 A1 | 5/2015 | Ono | |
| 2016/0102761 A1 | 4/2016 | Kuwahara et al. | |
| 2018/0115262 A1 | 4/2018 | Kamio | |

* cited by examiner

SHIFT RANGE CONTROL APPARATUS

CROSS REFERENCE TO RELATED APPLICATION

This application is a continuation application of International Patent Application No. PCT/JP2018/019083 filed on May 17, 2018, which designated the U.S. and based on and claims the benefits of priority of Japanese Patent Application No. 2017-105425 filed on May 29, 2017. The entire disclosure of all of the above applications is incorporated herein by reference.

TECHNICAL FIELD

The present disclosure relates to a shift range control apparatus.

BACKGROUND

A shift range switching device switches a shift range by controlling a motor in accordance with a shift range switching request from a driver.

SUMMARY

The shift range control apparatus of the present disclosure controls a shift range switching system that switches a shift range of a vehicle by controlling driving of a motor, and includes a motor rotational angle sensor, an output shaft sensor, and a shift range control unit. The motor rotational angle sensor detects a rotational position of the motor and outputs a motor rotational angle signal according to the rotational position of the motor. The output shaft sensor detects a change in the magnetic field of the target that rotates integrally with the output shaft to which the rotation of the motor is transmitted, and outputs output shaft signal corresponding to the rotational position of the output shaft.

The shift range control unit includes a motor control unit. The motor control unit controls driving of the motor based on the motor rotational angle signal.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, a shift range control apparatus will be described with reference to the drawings.

One Embodiment

Figure 1:
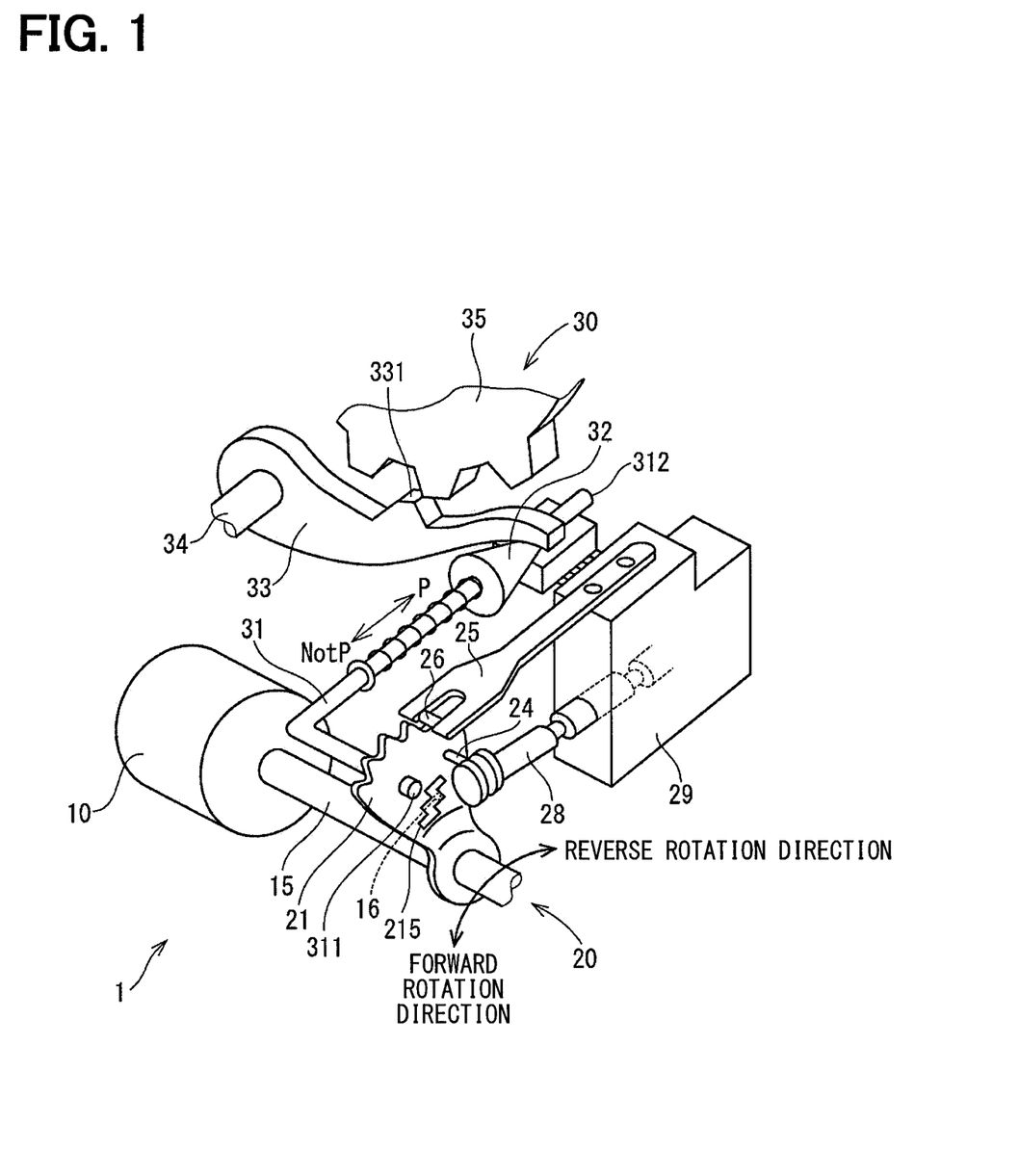
FIG. 1 is a perspective view showing a shift-by-wire system according to one embodiment.
Figure 2:
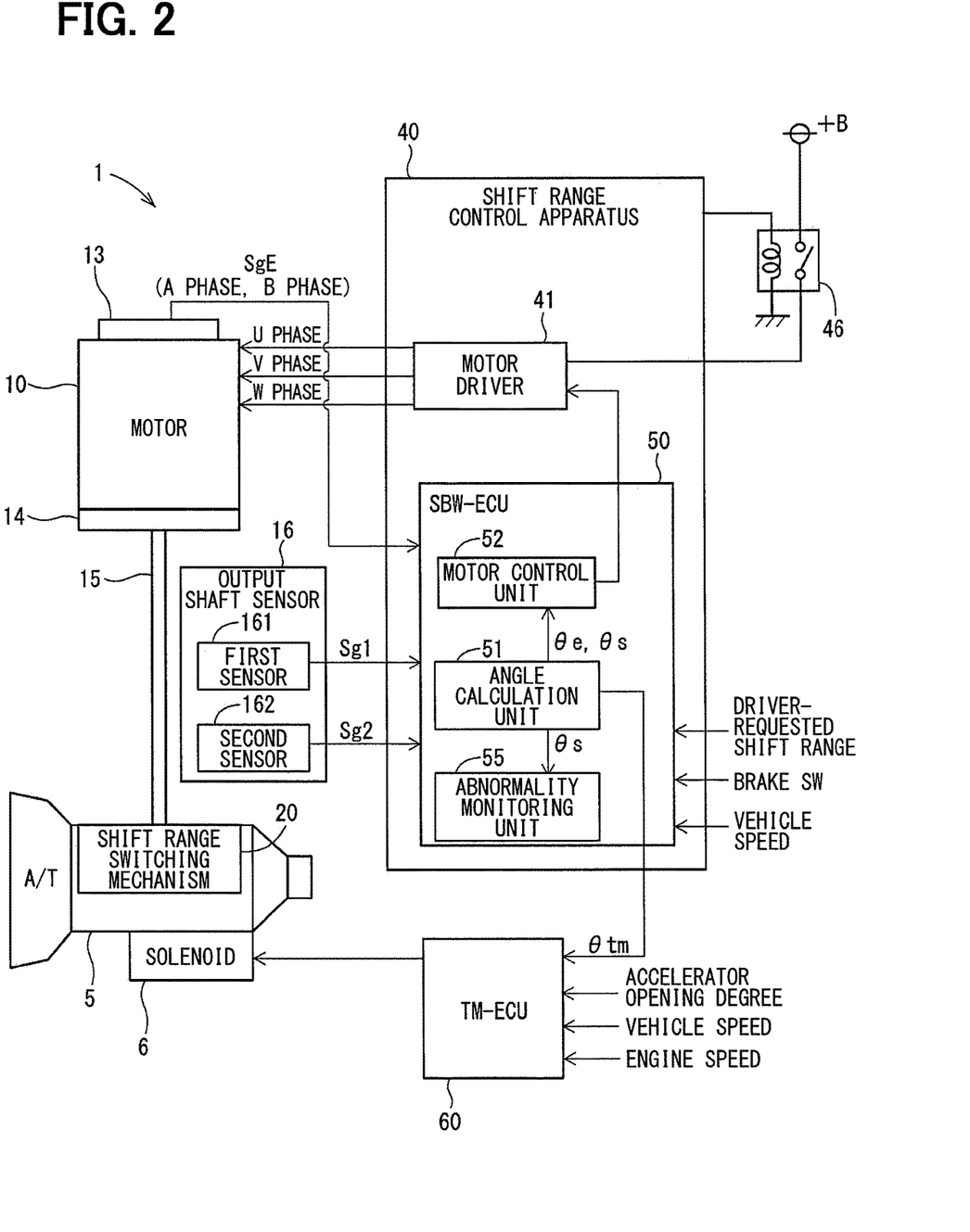
FIG. 2 is a block diagram showing a general configuration of the shift-by-wire system according to the embodiment.

As shown in FIGS. 1 and 2, a shift-by-wire system 1 as a shift range switching system includes a motor 10, a shift range switching mechanism 20, a parking lock mechanism 30, a shift range control apparatus 40 and the like. The motor 10 is rotated by power supplied from a battery which is installed in a vehicle (not shown) and functions as a drive source of the shift range switching mechanism 20. The motor 10 of the present embodiment is a switched reluctance motor. Hereinafter, the switched reluctance motor may be referred to as a "SR motor."

As shown in FIG. 2, an encoder 13 as a motor rotational angle sensor detects a rotational position of a rotor (not shown) of the motor 10. The encoder 13 is, for example, a magnetic rotary encoder including a magnet, which rotates integrally with a rotor, a Hall IC, which detects magnetism, and the like. The encoder 13 outputs an A-phase pulse signal and a B-phase pulse signal at respective predetermined angles in synchronization with rotation of the rotor. Hereinafter, the signal from the encoder 13 is referred to as a motor rotational angle signal SgE. In the present embodiment, the encoder 13 is configured as a single system that outputs one signal each for the A-phase and the B-phase. In the present embodiment, the encoder 13 has higher angle detection accuracy than the output shaft sensor 16. A speed reducer 14 is provided between a motor shaft of the motor 10 and an output shaft 15 and outputs the rotation of the motor 10 to the output shaft 15 after speed reduction. In this way, the rotation of the motor 10 is transmitted to the shift range switching mechanism 20.

The output shaft sensor 16 has a first sensor unit 161 and a second sensor unit 162, and detects a rotational position of the output shaft 15. The output shaft sensor 16 according to the present embodiment is a magnetic sensor that detects a change in the magnetic field of a target 215 (refer to FIG. 1) provided on a detent plate 21, which is a rotational member described later. The output shaft sensor 16 is attached to a position where the magnetic field of the target 215 is detectable. In the figure, the first sensor unit 161 is labeled as a first sensor and the second sensor unit 162 is labeled as a second sensor.

The sensor units 161 and 162 are so-called MR sensors having magnetoresistive elements (MR elements), which detect changes in the magnetic field of the target 215. The first sensor unit 161 detects a magnetic field corresponding to the rotational position of the target 215, and outputs an output shaft signal Sg1 to an SBW-ECU 50 described later. The second sensor unit 162 detects a magnetic field corresponding to the rotational position of the target 215, and outputs an output shaft signal Sg2 to the SBW-ECU 50. The output shaft sensor 16 of the present embodiment includes two sensor units 161 and 162, and independently transmit the output shaft signals Sg1 and Sg2 to the SBW-ECU 50. That is, the output shaft sensor 16 has a double system.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and the parking lock mechanism 30. The detent plate 21 is fixed to the output shaft 15 and driven by the motor 10. According to the embodiment, the direction in which the detent plate 21 moves away from the proximal end of the detent spring 25 is referred to as a forward rotation direction, and the direction in which the detent plate approaches the proximal end is referred to as a reverse rotation direction.

The detent plate 21 includes a pin 24 protruding in parallel with the output shaft 15. The pin 24 is connected to the manual valve 28. As the detent plate 21 is driven by the motor 10, the manual valve 28 moves back and forth in the axial direction. That is, the shift range switching mechanism 20 converts the rotary motion of the motor 10 into a linear motion and transmits the linear motion to the manual valve 28. The manual valve 28 is provided to a valve body 29. The reciprocating movement of the manual valve 28 in the axial direction switches hydraulic pressure supply paths to a hydraulic clutch (not shown) to switch the engaged state of the hydraulic clutch, so that the shift range is switched.

Figure 3:
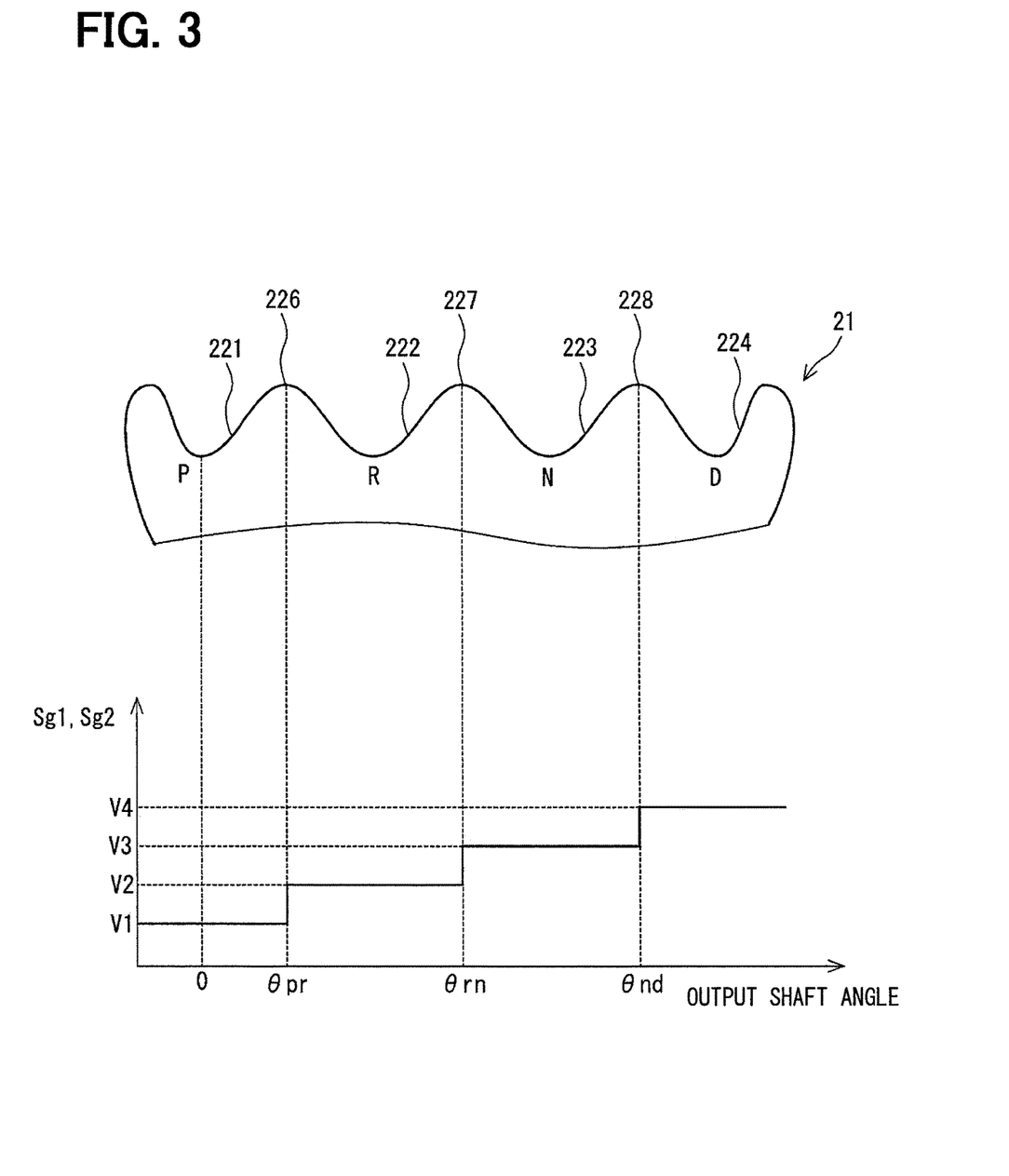
FIG. 3 is an illustration of an output shaft signal according to the embodiment.

As schematically shown in FIG. 3, four valley portions 221 to 224 are provided on a detent spring 25 side of the detent plate 21. The valley portions 221 to 224 correspond to the P, R, N, and D ranges respectively. Further, a mountain portion 226 is provided between the valley portion 221 corresponding to the P range and the valley portion 222 corresponding to the R range. A mountain portion 227 is provided between the valley portion 222 corresponding to the R range and the valley portion 223 corresponding to the N range. A mountain portion 228 is provided between the valley portion 223 corresponding to the N range and the valley portion 224 corresponding to the D range.

As shown in FIG. 1, the detent plate 21 is provided with a target 215 whose magnetic field changes according to the rotation of the output shaft 15. The target 215 is formed of a magnetic material. The target 215 may be a separate member from the detent plate 21. Alternatively, the target 215 may be formed by pressing on the detent plate 21 for example in case that the detent plate 21 is a magnetic material. The target 215 is formed such that output voltages, which are the output shaft signals Sg1 and Sg2 of the output shaft sensor 16, change stepwise in accordance with the rotational position of the output shaft 15. Details of the output shaft signals Sg1 and Sg2 will be described later.

The detent spring 25 is a resiliently deformable plate-like member provided with a detent roller 26 at a tip end. The detent roller 26 is an engaging member. The detent roller 26 fits into one of the valley portions 221 to 224. In the present embodiment, since the number of valley positions 221 to 224 formed in the detent plate 21 is four, the number of engagement positions in which the detent roller 26 engages is four.

The detent spring 25 presses the detent roller 26 toward a rotation center of the detent plate 21. When a rotational force equal to or larger than a predetermined level is applied to the detent plate 21, the detent spring 25 is deformed resiliently to enable the detent roller 26 to move among the valley portions 221 to 224. When the detent roller 26 fits into one of the valley portions 221 to 224, swing movement of the detent plate 21 is restricted. In this way, an axial position of a manual valve 28 and a state of the parking lock mechanism 30 are determined and the shift range of the automatic transmission 5 is fixed.

The parking lock mechanism 30 includes a parking rod 31, a conical member 32, a parking lock pawl 33, a shaft part 34 and a parking gear 35. The parking rod 31 is generally L-shaped, and one end 311 side is fixed to the detent plate 21. The conical member 32 is provided to the other end 312 of the parking rod 31. The conical member 32 is formed to reduce in diameter toward the other end 312. When the detent plate 21 pivots in a reverse rotation direction, the conical member 32 moves along a direction of an arrow P.

The parking lock pawl 33 is provided to abut on a conical surface of the conical member 32 and pivot around the shaft part 34. On the parking gear 35 side in the parking lock pawl 33, the parking lock pawl 33 has a protrusion 331 that can mesh with the parking gear 35. When the detent plate 21 rotates in the reverse direction to move the conical member 32 in the direction shown by the arrow P, the parking lock pawl 33 is raised to mesh the protrusion 331 with the parking gear 35. By contrast, when the detent plate 21 rotates in the forward rotation direction and the conical member 32 moves in the direction of arrow "NotP", the protrusion 331 is released from meshing with the parking gear 35.

The parking gear 35 is provided to an axle (not shown) and is enabled to mesh with the protrusion 331 of the parking lock pawl 33. The parking gear 35 meshing with the protrusion 331 restricts the rotation of the axle. When the shift range is one of NotP ranges, which are other than the P range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control apparatus 40 includes a motor driver 41 and a shift-by-wire ECU 50 as a shift range control unit. The shift-by-wire ECU is referred to as "SBW-ECU". The motor driver 41 outputs a drive signal related to energization of each phase (U-phase, V-phase, W-phase) of the motor 10. A motor relay 46 is provided between the motor driver 41 and a battery. The motor relay 46 is turned on when a start switch such as an ignition switch is turned on, and power is supplied to the motor 10 side. The motor relay 46 is turned off when the start switch is turned off, so that power supply to the motor 10 side is shut down.

The SBW-ECU 50 controls the switching of the shift range by controlling the drive of the motor 10 based on a driver-requested shift range, a signal from a brake switch, a vehicle speed and the like. A transmission ECU 60 as a transmission control unit controls the driving of a transmission hydraulic pressure control solenoid 6 based on an accelerator opening degree, the vehicle speed, an engine speed, and a second output shaft angle θtm described later. The transmission hydraulic control solenoid 6 is controlled to manipulate a shift stage. The number of the transmission hydraulic control solenoids 6 is determined according to the shift stage or the like. The transmission ECU may be referred to simply as "TM-ECU."

ECUs 50 and 60 are mainly composed of a microcomputer or the like and internally includes, although not shown, a CPU, a ROM (read-only non-transitory tangible memory device), an I/O and a bus line for connecting these components. The process in the ECUs 50, 60 may be software process by executing programs stored in advance in a tangible memory such as a ROM by a CPU, or hardware process by a dedicated electronic circuit. The ECUs 50 and 60 are configured to be able to mutually transmit and receive information via, for example, a CAN (Controller Area Network) or the like.

The SBW-ECU 50 has an angle calculation unit 51, a motor control unit 52, and an abnormality monitoring unit 55. The angle calculation unit 51 calculates the motor angle θe based on the A-phase and B-phase signals obtained from the encoder 13. Further, the angle calculation unit 51 calculates a first output shaft angle θs and a second output shaft angle θtm according to the rotational position of the output shaft 15. The first output shaft angle θs is calculated based on the output shaft signals Sg1 and Sg2 obtained from the output shaft sensor 16. The motor rotational angle signal SgE obtained from the encoder 13 is not used in the calculation of the first output shaft angle θs. The second output shaft angle θtm is calculated based on the motor rotational angle signal SgE obtained from the encoder 13 and the output shaft signals Sg1 and Sg2 obtained from the output shaft sensor 16. The SBW-ECU 50 transmits the calculated second output shaft angle θtm to the TM-ECU 60.

The motor control unit 52 controls the drive of the motor 10 based on the motor angle θe based on the detection value of the encoder 13 and the first output shaft angle θs. The second output shaft angle θtm may be used instead of the first output shaft angle θs. The motor control unit 52 controls the drive of the motor 10 by feedback control or the like so that the motor angle θe matches the target motor rotational angle according to the requested shift range. Details of the drive control for the motor 10 are not limited in particular. The abnormality monitoring unit 55 monitors an abnormality of the shift-by-wire system 1 based on the first output shaft angle θs.

In the present embodiment, the number of engagement positions of the detent roller 26 is four. The output shaft sensor 16 and the target 215 are provided so that the output shaft signals Sg1 and Sg2 change in four steps according to the engagement position of the detent roller 26. That is, in the present embodiment, the number of engagement positions and the number of steps of the output voltages that can be taken by the output shaft signals Sg1 and Sg2 coincide with each other.

As shown in FIG. 3, the output shaft angle is represented as 0 when the detent roller 26 (not shown in FIG. 3) is in the valley portion 221. The output shaft angle is represented as an angle θpr when the detent roller 26 is on a peak portion of the mountain portion 226. The output shaft angle is represented as an angle θrn when the detent roller 26 is positioned at the mountain portion 227. The output shaft angle is represented as an angle θnd when the detent roller 26 is positioned at the mountain portion 228. Here, the angle θpr, the angle θrn, and the angle θnd are set to the angle θpr<the angle θrn<the angle θnd, the output voltage is set to increase by rotating from the P range side to the D range side. However, the angle θpr, the angle θrn, and the angle θnd are set to the angle θpr>the angle θrn>the angle θnd, a reverse direction may be set so that the output voltage is increased by rotating from the D range side to the P range side. For example, when the output shaft 15 rotates to switch the shift range from the P range to the D range, the output shaft signals Sg1 and Sg2 are constant at the value V1 in a case where the output shaft angle is smaller than the angle θpr. When the output shaft angle becomes the angle θpr, the output shaft signals Sg1 and Sg2 change from the value V1 to a value V2. The output shaft signals Sg1 and Sg2 become constant at the value V2 in the range where the output shaft angle is greater than or equal to the angle θpr and smaller than the angle θrn. When the output shaft angle becomes the angle θrn, the output shaft signals Sg1 and Sg2 change from the value V2 to a value V3. The output shaft signals Sg1 and Sg2 become constant at the value V3 in the range where the output shaft angle is greater than or equal to the angle θrn and smaller than the angle θnd. When the output shaft angle becomes the angle θnd, the output shaft signals Sg1 and Sg2 change from the value V3 to a value V4. When the output shaft angle is equal to or larger than the angle θnd, the output shaft signals Sg1 and Sg2 are constant at the value V4.

In other words, the output shaft signals Sg1 and Sg2 have the value V1 in the P range, the value V2 in the R range, the value N3 in the N range, and the value V4 in the D range. The values V1, V2, V3 and V4 to which the output shaft signals Sg1 and Sg2 change possibly are discrete and not an intermediate value between two adjacent values. Further, a difference between the value V1 and the value V2, a difference between the value V2 and the value V3, and a difference between the value V3 and the value V4 are set to be sufficiently large values, respectively, as compared with the resolution and the sensor error. That is, in the present embodiment, the switching of the value from the first value to the second value, which differs to such an extent that it cannot be regarded as a continuous value in the movement among the valley portions 221 to 224 of the detent roller 26, is referred to as a stepwise change. The differences between the value V1 and the value V2, between the value V2 and the value V3 and between the value V3 and the value V4 may be equal or different one another.

The angle calculation unit 51 can calculate which angle range the output shaft 15 is in based on the output shaft signals Sg1 and Sg2 output from the output shaft sensor 16. In the present embodiment, the first output shaft angle θs is a value when the detent roller 26 is at the center of the valley portion 221 when the output shaft signals Sg1 and Sg2 have the value V1. The first output shaft angle θs is a value when the detent roller 26 is at the center of the valley portion 222 when the output shaft signals Sg1 and Sg2 have the value V2. The first output shaft angle θs is a value when the detent roller 26 is at the center of the valley portion 223 when the output shaft signals Sg1 and Sg2 have the value V3. The first output shaft angle θs is a value when the detent roller 26 is at the center of the valley portion 224 when the output shaft signals Sg1 and Sg2 have the value V4.

Figure 4:
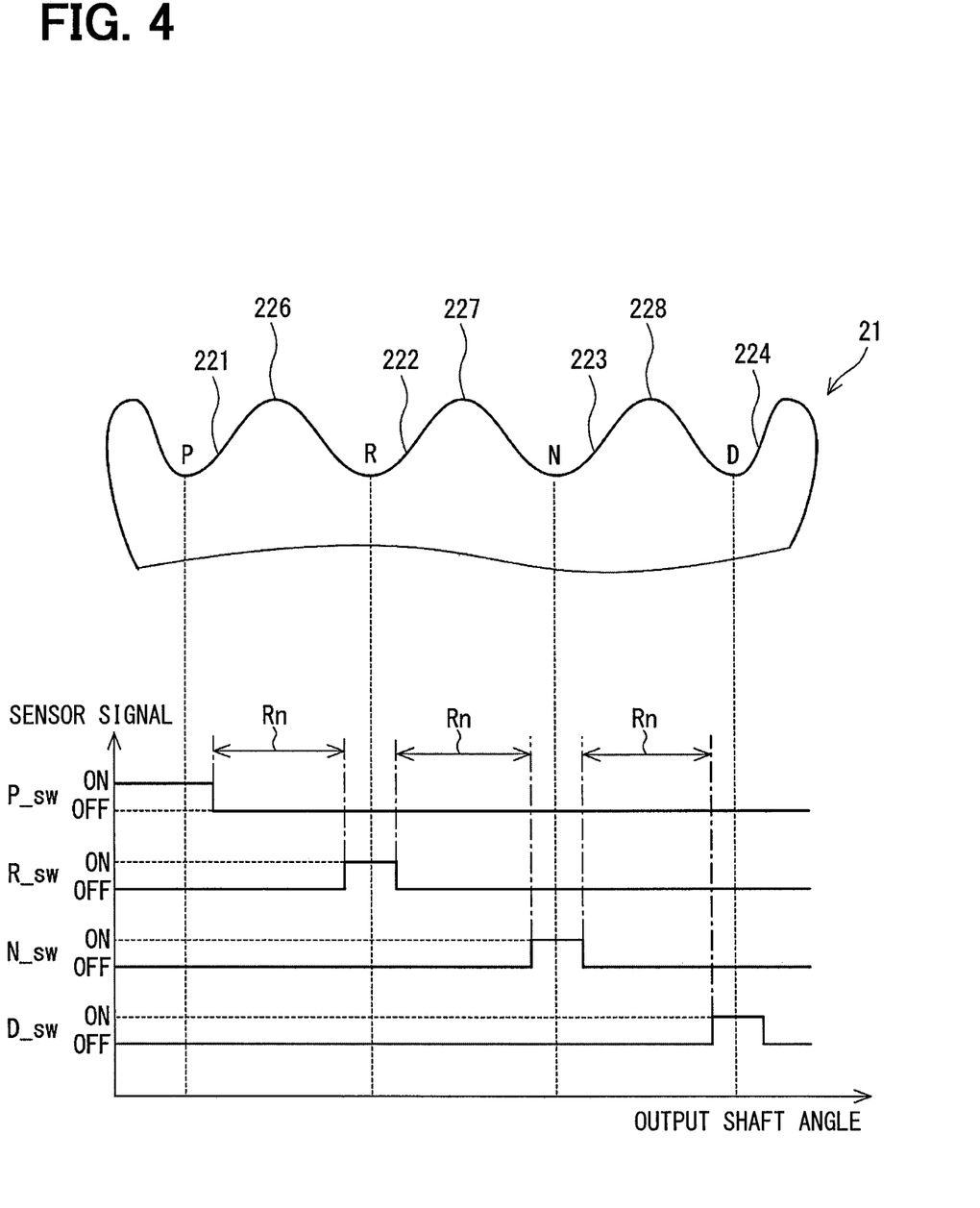
FIG. 4 is an illustration illustrating a sensor signal in the case where an output shaft sensor is a contact type switch according to a reference example.

FIG. 4 is a reference example in the case where the output shaft sensor is a contact type position sensor. The contact type position sensor is composed of four switches which includes a P range switch ("P-sw" in the figure), an R range switch ("R-sw" in the figure), an N range switch ("N-sw" in the figure) and a D range switch ("D-sw" in the figure). The contact type position sensors correspond to the respective range, and are turned on in a region where the automatic transmission 5 generates an oil pressure according to the range. There is also an indeterminate region Rn in which all the switches are turned off.

The contact type position sensor described in FIG. 4 has four switches, but one switch corresponds to one range, and the contact type position sensor is configured to be a single system. In the case of multiplexing contact type position sensors, the number of switches increases. Further, in the case of multiplexing contact point type sensors, there is a possibility that the configuration of the actuator side needs to be changed. Furthermore, contact type sensors may not meet the functional safety requirements.

In the present embodiment, the output shaft sensor 16 is a magnetic sensor that detects a change in the magnetic field of the target 215 without contact. Thus, the output shaft signals Sg1 and Sg2 output from the output shaft sensor 16 can be easily multiplexed. In the present embodiment, the output shaft sensor 16 is configured to be double system so as to meet the relatively high safety requirements. In the present embodiment, abnormality monitor of the shift-by-wire system 1 is performed using the detection value by the output shaft sensor 16.

For example, in case that the output shaft signals Sg1 and Sg2 are analog signals that change continuously according to the rotational position of the output shaft 15, process such as AD conversion is required. In the present embodiment, the output shaft sensor 16 and the target 215 are configured such that the output shaft signals Sg1 and Sg2 change stepwise according to the range. In case that the output shaft signals Sg1 and Sg2 have four steps or so, process such as AD conversion in the output shaft sensor 16 becomes unnecessary, so the configuration of the output shaft sensor 16 can be simplified.

By the way, as described in FIG. 4, in the automatic transmission 5, the hydraulic pressure corresponding to the shift range is generated in a predetermined area corresponding to the rotational position of the output shaft 15. Therefore, the angle calculation unit 51 uses the detection value of the encoder 13 to complement the detection value of the output shaft sensor 16 and calculates a second output shaft angle θtm that changes substantially continuously according to the rotation of the output shaft 15.

Figure 5:
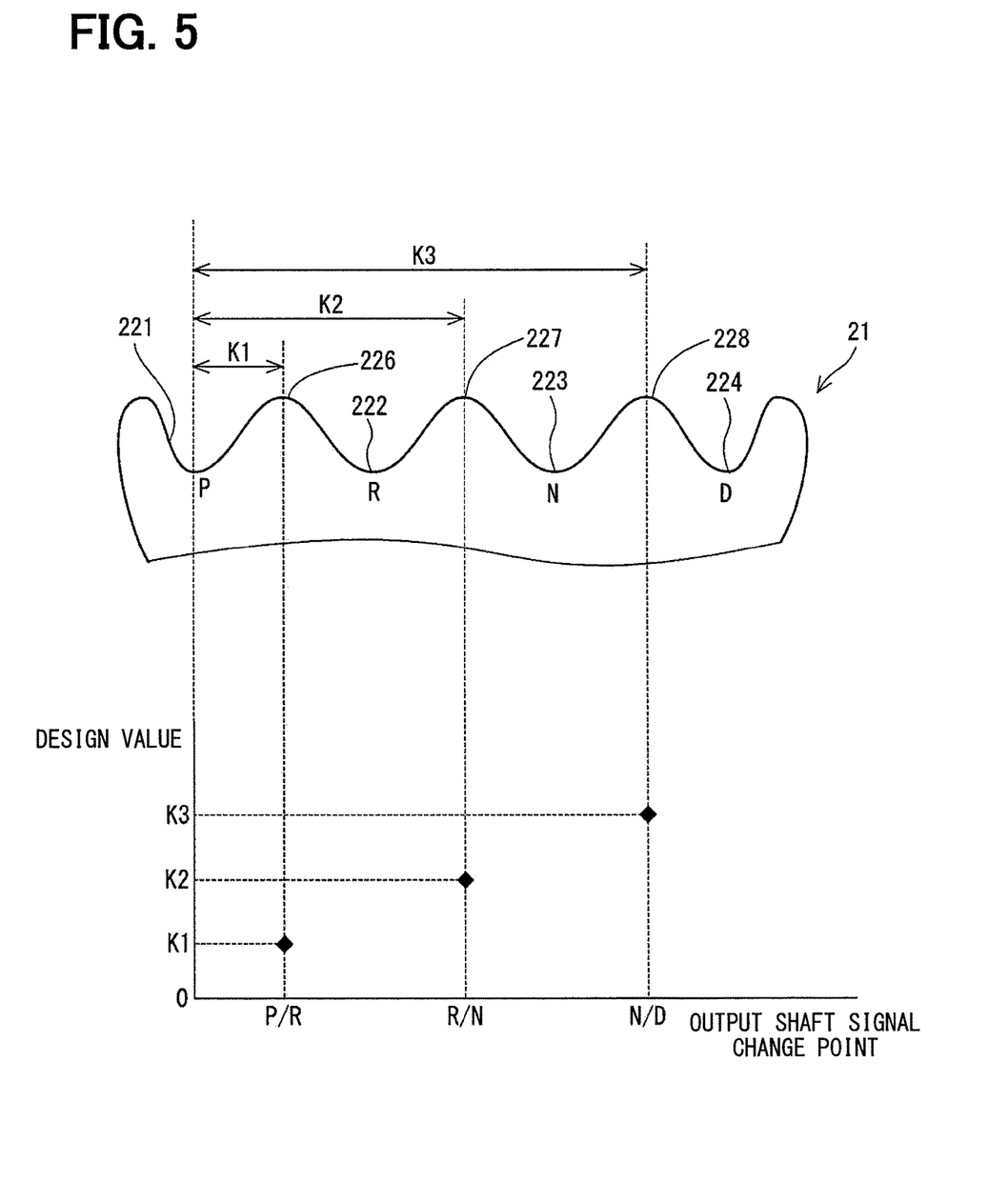
FIG. 5 is an illustration illustrating a design value of the output shaft angle according to the embodiment.

The calculation of the second output shaft angle θtm will be described based on FIGS. 5 to 7. FIG. 5 is a diagram for explaining design values K1 to K3 related to the rotational position of the output shaft 15. As described based on FIG. 3, in the present embodiment, the output shaft signals Sg1 and Sg2 are configured to change at the timing when the detent roller 26 passes over the mountain portions 226 to 228. Therefore, in the present embodiment, points at which the output shaft signals Sg1 and Sg2 change and design values K1, K2 and K3 are associated and stored in advance in a ROM (not shown) or the like.

The design value K1 when the output shaft signals Sg1 and Sg2 change between the P range and the R range is a value corresponding to the angle between the valley portion 221 corresponding to the P range and the mountain portion 226. The design value K2 when the output shaft signals Sg1 and Sg2 change between the R range and the N range is a value corresponding to the angle between the valley portion 221 and the mountain portion 227. The design value K3 when the output shaft signals Sg1 and Sg2 change between the N range and the D range is a value corresponding to the angle between the valley portion 221 and the mountain portion 228. In the figure, the point at which the output shaft signals Sg1 and Sg2 change between the P range and the R range is represented as "P/R", and the point at which the output shaft signals Sg1 and Sg2 change between the R range and the N range is represented as "R/N", and a point at which the output shaft signals Sg1 and Sg2 change between the N range and the D range is represented as "N/D".

Figure 6:
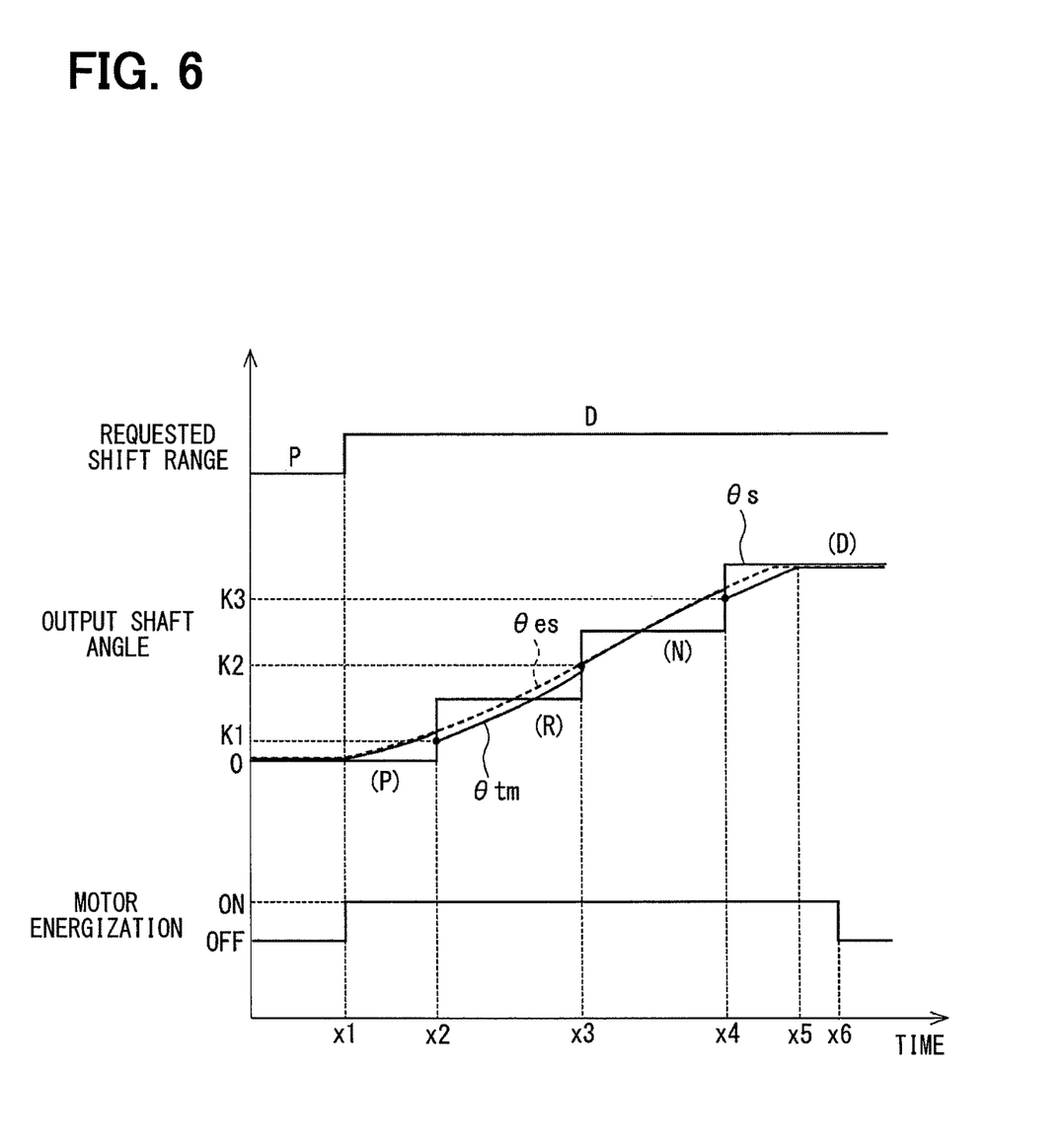
FIG. 6 is an illustration illustrating a calculation of a second output shaft angle according to the embodiment.
Figure 7:
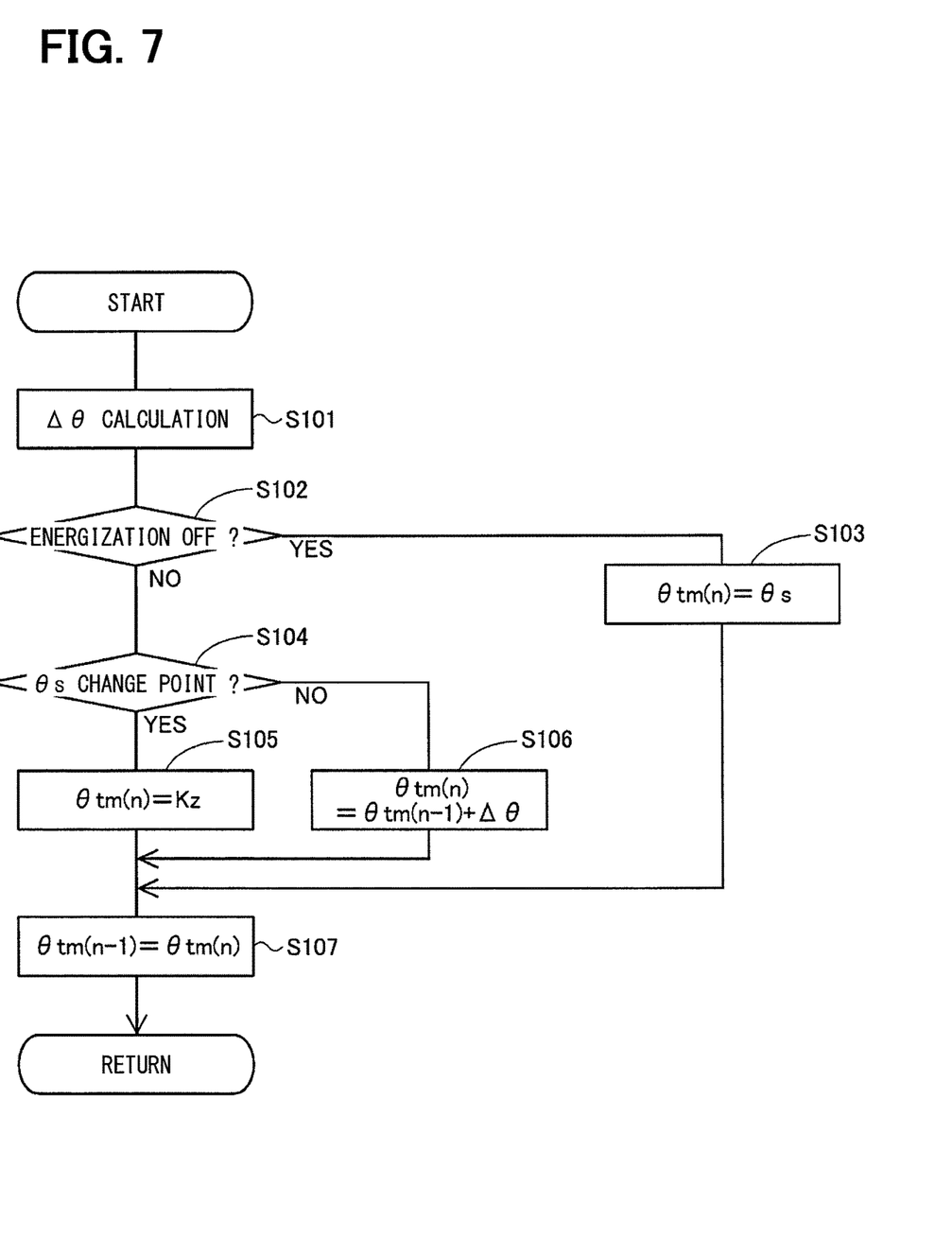
FIG. 7 is a flow chart illustrating an estimation process of the second output shaft angle according to one embodiment.

FIG. 6 is a time chart explaining the case where the shift range is switched from the P range to the D range, where the horizontal axis is time, and from the top, the requested shift range, the output shaft angle, and the motor energization are shown. In FIG. 6, an angle θes in FIG. 6 is a value obtained by converting the motor angle θe into the rotational angle of the output shaft 15 with the gear ratio of the speed reducer 14, and is hereinafter referred to as a motor angle converted value. Also, the range corresponding to the output shaft angle is described in parentheses. In FIG. 6, for the sake of explanation, the difference between the motor angle converted value θes and the second output shaft angle θtm is described so that it can be understood.

When the requested shift range is switched from the P range to the D range at time x1, energization to the motor 10 is started, and the motor angle converted value θes changes as the motor 10 rotates. The first output shaft angle θs does not change until the time x2 when the detent roller 26 climbs over the mountain portion 226. Therefore, in the angle calculation unit 51 the second output shaft angle θtm is represented as 0 when the shift range is the P range. An angle change amount Δθ, which is the change amount of the motor angle converted value θes, is accumulated from time x1 to time x2, and the second output shaft angle θtm is set.

When the detent roller 26 climbs over the mountain portion 226 at time x2, the first output shaft angle θs changes stepwise. Further, the second output shaft angle θtm is set to the design value K1 at the timing when the output shaft signals Sg1 and Sg2 change. The second output shaft angle θtm from the time x2 to the time x3 is calculated by integrating the angle change amount Δθ to the previous value.

When the detent roller 26 climbs over the mountain portion 227 at time x3, the first output shaft angle θs changes stepwise. Further, the second output shaft angle θtm is set to the design value K2 at the timing when the output shaft signals Sg1 and Sg2 change. The second output shaft angle θtm between the time x3 and the time x4 is calculated by integrating the angle change amount Δθ to the previous value.

When the detent roller 26 climbs over the mountain portion 228 at time x4, the first output shaft angle θs changes stepwise. Further, the second output shaft angle θtm is set to the design value K3 at the timing when the output shaft signals Sg1 and Sg2 change. The second output shaft angle θtm from the time x4 to the time x5 is calculated by integrating the angle change amount Δθ to the previous value. When the detent roller 26 fits in the valley portion 224, the motor 10 is stopped, and the output shaft angles θs and θtm match at time x5. Then, at time x6, which is a predetermined timing after the detent roller 26 is fitted into the valley portion 224, energization to the motor 10 is turned off.

The estimation process of the second output shaft angle θtm will be described based on the flowchart of FIG. 7. This process is executed by the angle calculation unit 51 at a predetermined cycle (for example, 1 ms). Hereinafter, "step" in step S101 is omitted, and is simply referred to as a symbol "S." The same applies to the other steps. Hereinafter, (n) is added to the current value and (n−1) is added to the previous value. At first, in the S101, the angle calculation unit 51 subtracts the previous value from the current value of the motor angle converted value θes so as to calculate the amount of angle change Δθ (see equation (1)).

$$\Delta\theta = \theta es(n) - \theta es(n-1) \qquad (1)$$

In S102, the angle calculation unit 51 determines whether or not the motor 10 is deenergized. If it is determined that the energization to the motor 10 is on (NO in S102), the process proceeds to S104. If it is determined that the energization to the motor 10 is off (YES in S102), the process proceeds to S103.

In S103, the current value of the second output shaft angle θtm is set as a first output shaft angle θs. When the motor 10 is not energized, the detent roller 26 is fitted in any of the valley portions 221 to 224 and the output shaft 15 is not rotating, so the first output shaft angle θs based on the output shaft sensor 16 may be set as the second output shaft angle θtm as it is.

When energization to the motor 10 is turned on (NO in S102), the process proceeds to S104, and in this S104, the angle calculation unit 51 determines whether or not it is a change point of the first output shaft angle θs. Here, when the output shaft signals Sg1 and Sg2 has changed by at least a determination threshold value compared to the previous value, it is determined that it is the change point of the first output shaft angle θs. The determination threshold value is set to be a sufficiently large value as compared to noise, sensor error and the like. If it is determined that it is the change point of the output shaft angle θs (YES in S104), the process proceeds to S105. If it is determined that it is not the change point of the first output shaft angle θs (NO in S104), the process proceeds to S106.

In S105, the angle calculation unit 51 sets the current value of the second output shaft angle θtm as the design value Kz. Here, "z" is any one of 1, 2, and 3. If it is a change point between the P range and the R range, it is the design value K1, if it is a change point between the R range and the N range, it is the design value K2, and if it is a change point between the N range and the D range, it is the design value K3.

In S106, the angle calculation unit 51 sets that a value obtained by adding the angle change amount Δθ calculated in S101 to the previous value of the second output shaft angle θtm is set as the current value of the second output shaft angle θtm (see, formula (2)).

$$\theta tm(n)=\theta tm(n-1)+\Delta\theta \quad (2)$$

In S107, which is proceeded to after S103, S105, or S106, the angle calculation unit 51 stores the calculated current value of the second output shaft angle θtm as a previous value in the next calculation in a storage unit such as a RAM that is not stored. The calculated second output shaft angle θtm is output to the TM-ECU 60 by CAN communication or the like.

Figure 8:
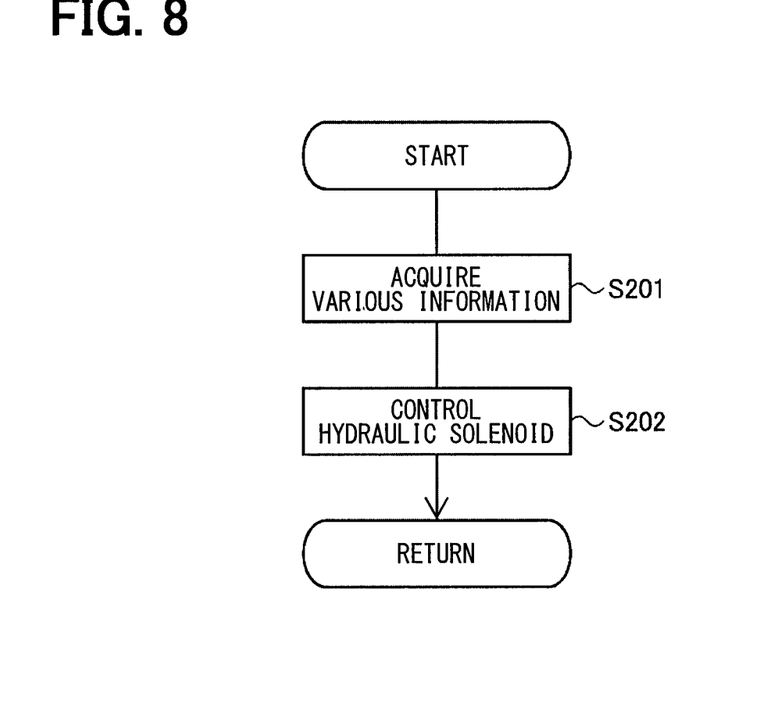
FIG. 8 is a flowchart illustrating hydraulic control process according to the embodiment.

The hydraulic control process in the TM-ECU 60 will be described based on a flowchart of FIG. 8. This process is executed by the TM-ECU 60 at a predetermined cycle. The control cycle of the hydraulic control process may be the same as or different from the various calculation cycles in the SBW-ECU 50.

In S201, the TM-ECU 60 acquires various information necessary for hydraulic control. The TM-ECU 60 acquires the second output shaft angle θtm from the SBW-ECU 50 as one of information necessary for hydraulic control. In addition, the TM-ECU 60 acquires information such as the vehicle speed, the engine speed, and the accelerator open degree, and the like. In S202, the TM-ECU 60 controls the transmission hydraulic control solenoid 6 based on the acquired second output shaft angle θtm, vehicle speed, engine speed, accelerator open degree, and the like. Since the manual valve 28 has an axial position determined according to the rotational position of the detent plate 21, the second output shaft angle θtm can be regarded as a manual valve shaft angle.

Figure 9:
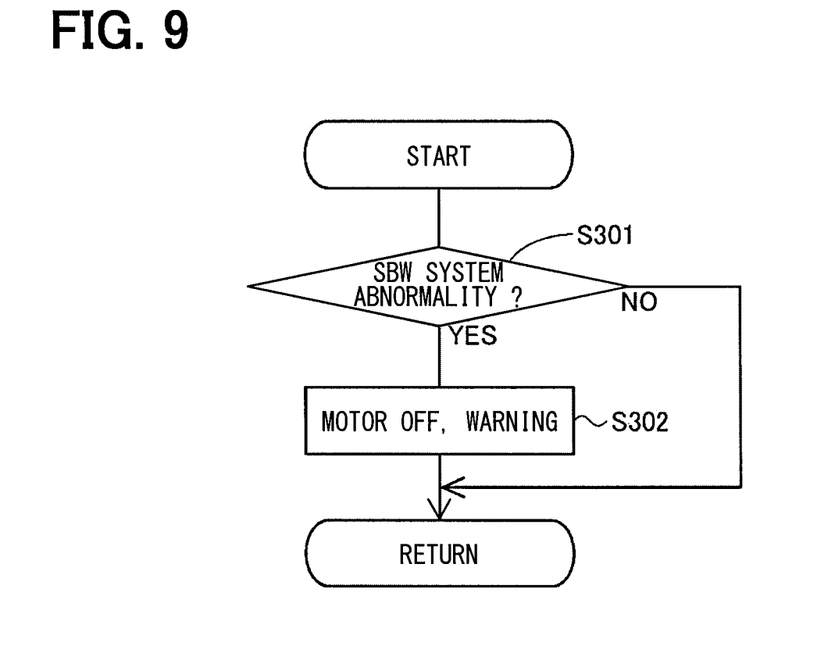
FIG. 9 is a flowchart illustrating an abnormality monitoring process according to the embodiment.

The abnormality monitoring process in the abnormality monitoring unit 55 of the SBW-ECU 50 will be described based on a flowchart of FIG. 9. This process is executed at a predetermined cycle by the abnormality monitoring unit 55. The control cycle of the abnormality monitoring process may be the same as or different from other processes. In S301, the abnormality monitoring unit 55 determines whether or not a system abnormality has occurred in the shift-by-wire system 1. In the present embodiment, when the state where the driver requested shift range and the actual range are different continues for the continuation determination time or more, it is determined that the shift-by-wire system 1 is abnormal. Here, the first output shaft angle θs is used to detect the actual range. In other words, in the abnormality monitoring of the shift-by-wire system 1, the first output shaft angle θs based on the detection value of the output shaft sensor 16 that is a double system is used as information related to the angle of the output shaft 15. the second output shaft angle θtm including information of the encoder 13 that is a single system is not used. The continuation determination time is set to a time (for example, 1 s) that is sufficiently longer than the time required for switching the shift range (for example, about 0.1 to 0.2 s).

If it is determined that there is no abnormality in the shift-by-wire system 1 (NO in S301), the routine is terminated without performing the process of S302. When it is determined that an abnormality has occurred in the shift-by-wire system 1 (YES in S301), the process proceeds to S302. In S302, the SBW-ECU 50 turns off the energization to the motor 10. Further, the SBW-ECU 50 warns the user that the abnormality has occurred in the shift-by-wire system 1. As a warning method for the user, for example, a warning lamp on the instrument panel is turned on. A method of warning to the user is not limited to lighting of the warning light, but may be any method such as guidance by voice. This will encourage the user to bring in the vehicle to a repair shop, etc.

In this embodiment, the output shaft sensor 16 is a non-contact type magnetic sensor that detects a change in the magnetic field of the target 215 that rotates integrally with the detent plate 21. Thereby, the output shaft sensor 16 can be made into a multiple system (a double system in the present embodiment) without largely changing the structure on the actuator side. Further, the first output shaft angle θs based on the detection value of the output shaft sensor 16 is used for monitoring the abnormality of the shift-by-wire system 1. Thereby, in the abnormality monitoring of the shift-by-wire system 1, a relatively high demand for functional safety can be satisfied.

On the other hand, the hydraulic control in the TM-ECU 60 requires accuracy of the angle rather than functional safety. Therefore, the second output shaft angle θtm is calculated using the detection value of the encoder 13 which is a single system but has high accuracy of the angle, in addition to the detection value of the output shaft sensor 16 whose signal changes stepwise. The second output shaft angle θtm is used for hydraulic control in the TM-ECU 60. The second output shaft angle θtm can be regarded as a composite signal based on the detection value of the output shaft sensor 16 and the detection value of the encoder 13. In the hydraulic control in the TM-ECU 60, by using the second output shaft angle θtm based on the detection values of the output shaft sensor 16 and the encoder 13, the transmission hydraulic control solenoid 6 can be appropriately controlled.

As described above, the shift range control apparatus 40 of the present embodiment controls the shift-by-wire system 1 that switches the shift range of the vehicle by controlling the drive of the motor 10, and includes the encoder 13 and the output shaft sensor 16, and the SBW-ECU 50. The encoder 13 detects the rotational position of the motor 10 and outputs a motor rotational angle signal SgE corresponding to the rotational position of the motor 10. The output shaft sensor 16 detects a change in the magnetic field of the target 215 that rotates integrally with the output shaft 15 to which the rotation of the motor 10 is transmitted, and outputs output shaft signals Sg1 and Sg2 corresponding to the rotational position of the output shaft 15.

The SBW-ECU 50 has the angle calculation unit 51, the motor control unit 52, and the abnormality monitoring unit 55. The motor control unit 52 controls driving of the motor 10 based on the motor rotational angle signal SgE. The angle calculation unit 51 calculates the first output shaft angle θs based on the output shaft signals Sg1 and Sg2, and the second output shaft angle θtm based on the output shaft signals Sg1 and Sg2 and the motor rotational angle signal SgE. The motor control unit 52 controls driving of the motor 10 based on the motor rotational angle signal SgE. The abnormality monitoring unit 55 monitors the abnormality of the shift-by-wire system 1 based on the first output shaft angle θs. The SBW-ECU 50 outputs the second output shaft angle θtm to the TM-ECU 60 that controls the shift position of the automatic transmission 5.

The output shaft sensor 16 of the present embodiment is a so-called magnetic sensor that detects the rotational position of the output shaft 15 by detecting a change in the magnetic field of the target 215. By using the output shaft sensor 16 as a magnetic sensor, the output shaft signals Sg1 and Sg2 can be easily multiplexed without changing the configuration on the actuator side, and a relatively high demand for safety requirement can be satisfied.

The angle calculation unit calculates two types of signals, the first output shaft angle θs and the second output shaft angle θtm. Here, for example, it is assumed that the output shaft sensor 16 is configured to be multiplexing system, the encoder 13 is configured not to be multiplexing system, and the detection accuracy of the encoder 13 is higher than that of the output shaft sensor 16. In the above case, the first output shaft angle θs satisfies a relatively high safety requirement, and the second output shaft angle θtm satisfies a relatively high angle accuracy requirement. In the present embodiment, the first output shaft angle θs satisfying relatively high safety requirements is used for abnormality monitoring such as diagnosis and fail-safe of the shift-by-wire system 1, and the second output shaft angle θtm having a relatively high angle accuracy is used for the control of the automatic transmission 5. The shift-by-wire system 1 can be appropriately controlled by properly using the first output shaft angle θs and the second output shaft angle θtm according to safety requirements and angle accuracy requirements required for various calculations.

The target 215 is provided on the detent plate 21 that is formed with a plurality of valley portions 221 to 224 with which the detent roller 26 is engaged according to the shift range, and rotates integrally with the output shaft 15. The output shaft signals Sg1 and Sg2 change stepwise to take different values between before and after the movement when the detent roller 26 moves between the adjacent valley portions 221 to 224. Thereby, the rotational position of the output shaft 15 can be detected appropriately. If the output shaft signals Sg1 and Sg2 are output in about four stages, the output shaft sensor 16 does not require AD conversion process or the like. Therefore, for example, the configuration of the output shaft sensor 16 can be simplified as compared with a configuration in which the output continuously changes according to the rotation of the output shaft 15.

The second output shaft angle θtm is calculated based on the rotational position of the output shaft 15 at the timing when the output shaft signals Sg1 and Sg2 change, and the angular change amount Δθ that is a change amount of the rotational position of the output shaft 15 based on the motor rotational angle signal SgE. Accordingly, the second output shaft angle θtm can be appropriately calculated based on the detection values of the output shaft sensor 16 and the encoder 13.

OTHER EMBODIMENTS

In the above embodiment, the motor is an SR motor. In other embodiments, the motor may be any motor, such as a DC brushless motor. In the above embodiment, although the number of winding sets of the motor is not described, the number of winding sets may be one or plural. In the above embodiments, the motor rotational angle sensor is the encoder. As another embodiment, the motor rotational angle sensor need not necessarily be the encoder but may be any other devices such as a resolver.

In the above embodiment, the MR sensor is used as the output shaft sensor. As another embodiment, a magnetic sensor other than the MR sensor may be used. Moreover, in the above embodiment, a double system is formed such that two independent output shaft signals are output from the output shaft sensor. As another embodiment, the number of output shaft signals output from the output shaft sensor may be one or three or more. That is, the output shaft sensor may be configured to be a single system type or a triple or more multiplex system type. The motor rotational angle sensor may be configured to be a multiple system.

In the above embodiment, the rotational member is the detent plate, and the engagement member is the detent roller. As another embodiment, the rotational member and the engagement member are not limited to the detent plate and the detent roller, but may be any other type in regard to a shape and the like. In the above embodiment, the detent plate is provided with four valley portions. As another embodiment, the number of the valley portions is not limited to four but may be any number. For example, the number of valley portions of the detent plate may be two so that the P-range and the not P-range may be switched. The shift range switching mechanism and the parking lock mechanism or the like may be different from those in the embodiments described above.

In the above embodiment, the number of engagement positions matches the number of steps of the output shaft signal. In other embodiments, the number of engagement positions and the number of steps of the output shaft signal may be different. Further, the output shaft signal is not limited to a signal that changes stepwise, and may be a signal having any shape. In the above embodiment, when the detent plate rotates from the P range to the D range direction, the output shaft signal increases. In another embodiment, when the detent plate rotates in the direction from the P range to the D range, the output shaft signal may be configured to be small.

According to the embodiments described above, the speed reducer is provided between the motor shaft and the output shaft. Although the details of the speed reducer are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the speed reducer between the motor shaft and the output shaft may be omitted, or a mechanism other than the speed reducer may be provided.

In the above embodiment, the shift range control unit and the transmission control unit are configured by separate ECUs. In another embodiment, the shift range control unit and the transmission control unit may be configured by one ECU, and the second output shaft angle may be output internally. The present disclosure is not limited to the embodiments described above, and various modifications are employable within the scope of the present disclosure without departing from the spirit of the invention.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

In an assumable example, an output shaft sensor is provided to detect a rotational angle of an output shaft firmly fitted and coupled to a rotation shaft of a speed reduction mechanism that transmits rotation of a motor after speed reduction.

In the above example, a potentiometer whose output voltage linearly changes according to a rotational angle, or a switch which is turned on in a rotational angle range corresponding to each range is exemplified as an output shaft sensor. The potentiometer or switch is a contact type sensor. Therefore, for example, in the case of multiplexing the output axis sensor in order to satisfy a relatively high demand for safety, it is necessary to change the structure of the range switching mechanism. An object of the present disclosure is to provide a shift range control apparatus capable of easily multiplexing signals of the output shaft sensor.

The shift range control apparatus of the present disclosure controls a shift range switching system that switches a shift range of a vehicle by controlling driving of a motor, and includes a motor rotational angle sensor, an output shaft sensor, and a shift range control unit. The motor rotational angle sensor detects a rotational position of the motor and outputs a motor rotational angle signal according to the rotational position of the motor. The output shaft sensor detects a change in the magnetic field of the target that rotates integrally with the output shaft to which the rotation of the motor is transmitted, and outputs output shaft signal corresponding to the rotational position of the output shaft.

The shift range control unit includes a motor control unit, an angle calculation unit, and an abnormality monitoring unit. The motor control unit controls driving of the motor based on the motor rotational angle signal. The angle calculation unit calculates a first output shaft angle based on the output shaft signal and a second output shaft angle based on the output shaft signal and the motor rotational angle signal. The abnormality monitoring unit monitors an abnormality of the shift range switching system based on the first output shaft angle. The shift range control unit outputs the second output shaft angle to the transmission control unit that controls the shift stage of the automatic transmission.

The output shaft sensor is a so-called magnetic sensor that detects the rotational position of the output shaft by detecting a change in the magnetic field of the target. By using the output shaft sensor as a magnetic sensor, the output shaft signal can be easily multiplexed without changing the configuration on the actuator side, and a relatively high demand for safety requirement can be satisfied. In addition, the angle calculation unit calculates two types of signals, a first output shaft signal and a second output shaft signal. The shift range switching system can be appropriately controlled by properly using the first output shaft angle and the second output shaft angle according to safety requirements and angle accuracy requirements required for various calculations.

The invention claimed is:

1. A shift range control apparatus that controls a shift range switching system for switching a shift range of a vehicle by controlling driving of a motor, comprising:
   a motor rotational angle sensor configured to detect a rotational position of the motor and output a motor rotational angle signal corresponding to the rotational position of the motor;
   an output shaft sensor configured to detect a change in a magnetic field of a target that rotates integrally with an output shaft to which the rotation of the motor is transmitted, and output an output shaft signal corresponding to the rotational position of the output shaft; and
   a shift range control unit including a motor control unit configured to control driving of the motor based on the motor rotational angle signal, wherein
   the target is provided on a rotating member that is formed with a plurality of valley portions with which an engaging member is engaged according to a shift range, and rotates integrally with the output shaft, and
   the output shaft signal changes stepwise so as to have different values between before and after movement when the engagement member moves to an adjacent valley portion.

2. The shift range control apparatus according to claim 1, wherein
   the shift range control unit includes an angle calculation unit configured to calculate a first output shaft angle based on the output shaft signal and a second output shaft angle based on the output shaft signal and the motor rotational angle signal, and an abnormality monitoring unit configured to monitor an abnormality of the shift range switching system based on the first output shaft angle, and
   the shift range control unit outputs the second output shaft angle to a transmission control unit that controls a shift stage of the automatic transmission.

3. The shift range control apparatus according to claim 2, wherein
   the second output shaft angle is calculated based on a rotational position of the output shaft at a timing when the output shaft signal changes and a change amount of the rotational position of the output shaft based on the motor rotational angle signal.

4. The shift range control apparatus according to claim 1, wherein
   the number of the valley portions with which the engaging member is engaged is identical to number of steps of the output shaft signal.

5. The shift range control apparatus according to claim 1, wherein
   the rotating member includes a plurality of the valley portions and a plurality of mountain portions formed between the adjacent valley portions,
   the output shaft respectively sets an output shaft angle when located at each of the plurality of the mountain portions, and
   the output shaft signal has a first value up to the first output shaft angle, and a second value between the first output shaft angle and the second output shaft angle, and the first value and the second value are constant values.

6. The shift range control apparatus according to claim 5, wherein
   a difference between the first value and the second value is set to be sufficiently large values, as compared with the resolution and the sensor error.

7. The shift range control apparatus according to claim 1, wherein
   the output shaft sensor has a first sensor unit and a second sensor unit that detect a change in the magnetic field of the target, and outputs output shaft signals independently of each other so that the output shaft sensor is configured to be a double system.

* * * * *